US012714061B2

(12) United States Patent
Gandikota et al.

(10) Patent No.: US 12,714,061 B2
(45) **Date of Patent: *Aug. 25, 2026**

(54) ANIMAL LITTER, PROCESS FOR PREPARING ANIMAL LITTER AND METHOD OF REMOVAL OF ANIMAL WASTE

(71) Applicant: Kent Consumer Brands Americas, LLC, Muscatine, IA (US)

(72) Inventors: Somayajulu Venkata Satya Gandikota, Bettendorf, IA (US); Rod Hohenadel, Letts, IA (US); Xiaowen Guo, Muscatine, IA (US)

(73) Assignee: Kent Consumer Brands Americas, LLC, Muscatine, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/234,904

(22) Filed: Jun. 11, 2025

(65) Prior Publication Data

US 2025/0302001 A1 Oct. 2, 2025

Related U.S. Application Data

(63) Continuation of application No. 18/240,260, filed on Aug. 30, 2023, now Pat. No. 12,356,957.

(60) Provisional application No. 63/411,919, filed on Sep. 30, 2022.

(51) Int. Cl.
*A01K 1/015* (2006.01)

(52) U.S. Cl.
CPC .................................. *A01K 1/0155* (2013.01)

(58) Field of Classification Search
CPC .................................................... A01K 1/0155
See application file for complete search history.

(56) References Cited

U.S. PATENT DOCUMENTS 12,356,957 B2 * 7/2025 Gandikota ........... A01K 1/0155
2002/0106344 A1 * 8/2002 Lind ......................... A61L 9/01 424/76.21
2024/0107975 A1 * 4/2024 Gandikota ........... A01K 1/0155
2025/0302000 A1 * 10/2025 Gandikota ........... A01K 1/0155
2025/0302001 A1 * 10/2025 Gandikota ........... A01K 1/0155

* cited by examiner

*Primary Examiner* — Jessica B Wong
(74) *Attorney, Agent, or Firm* — Fitch, Even, Tabin & Flannery LLP

(57) ABSTRACT

An animal litter, process for preparing the animal litter, and a method for removal of animal waste using the animal litter are provided. The animal litter generally includes at least one sorbent and a sulfate such as sodium bisulfate. The animal litter is in the form of discrete plural particles which tend to agglomerate when wetted.

7 Claims, 1 Drawing Sheet

Trend

| | Record Number | Sample Name | Dx (10) (μm) | Dx (50) (μm) | Dx (90) (μm) |
|---|---|---|---|---|---|
| | 4 | Average of 'Rice hulls' | 258 | 547 | 1100 |
| Mean | | | 258 | 547 | 1100 |
| 1xStd Dev | | | 0.00 | 0.00 | 0.00 |
| 1xRSD (%) | | | 0.00 | 0.00 | 0.00 |

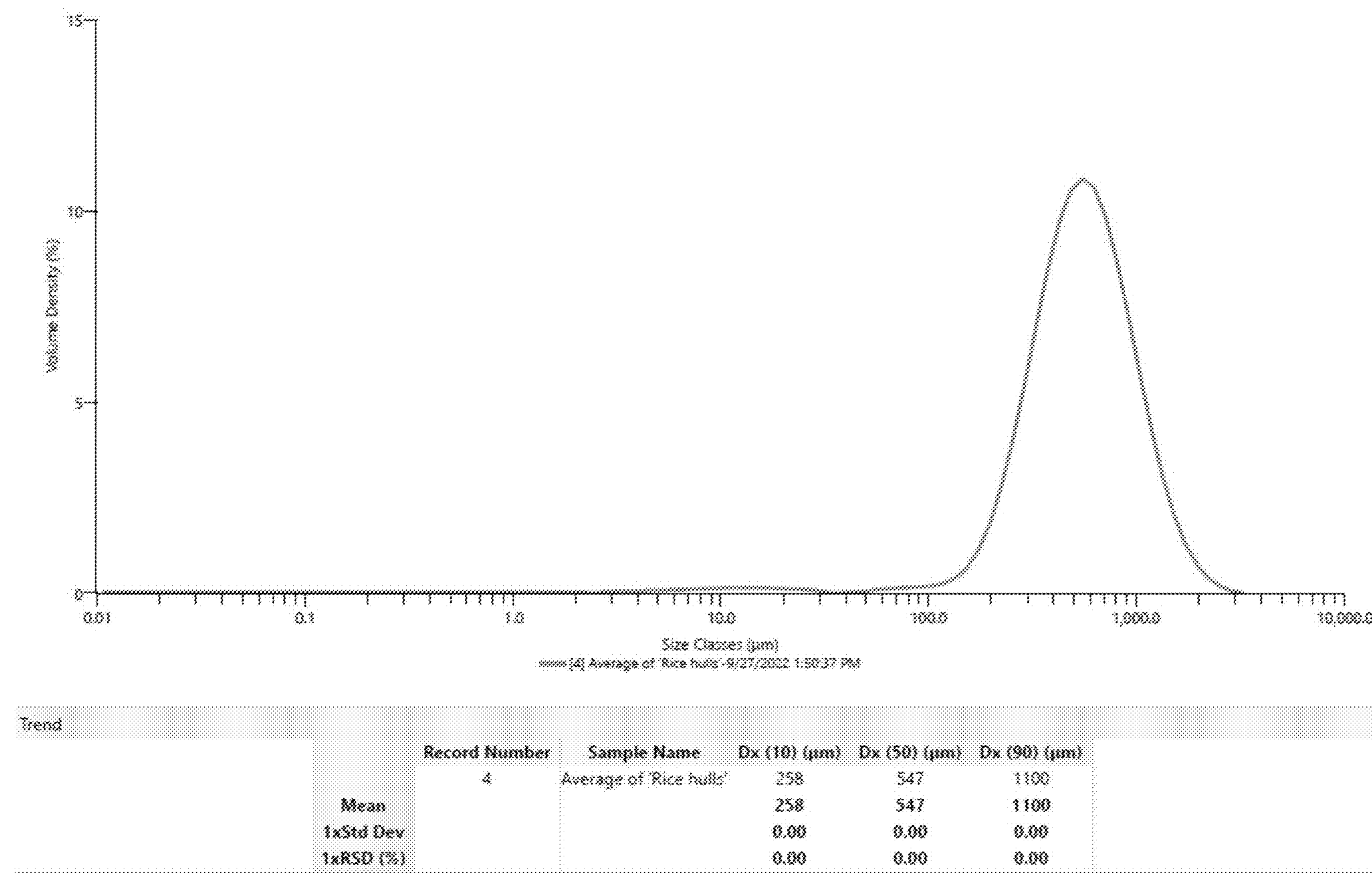
Volume Density (%)
15
10
5
0
0.01
0.1
1.0
10.0
100.0
1,000.0
10,000.0
Size Classes (μm)
[4] Average of 'Rice hulls'-9/27/2022 1:50:37 PM
Trend
Record Number
Sample Name
Dx (10) (μm)
Dx (50) (μm)
Dx (90) (μm)
4
Average of 'Rice hulls'
258
547
1100
Mean
258
547
1100
1xStd Dev
0.00
0.00
0.00
1xRSD (%)
0.00
0.00
0.00

ANIMAL LITTER, PROCESS FOR PREPARING ANIMAL LITTER AND METHOD OF REMOVAL OF ANIMAL WASTE

CROSS-REFERENCE TO RELATED APPLICATIONS

This application is a continuation of U.S. application Ser. No. 18/240,260 filed Aug. 30, 2023, which claims benefit of U.S. Provisional Application No. 63/411,919, filed Sep. 30, 2022, which are hereby incorporated herein by reference in their entireties.

FIELD

The present application relates to an animal litter, and more particularly to a litter that includes discrete plural particles which tend to agglomerate upon wetting. The application further pertains to a process for preparing an animal litter, methods for removal of animal waste, and related products, processes, and methods.

BACKGROUND

Clumping animal litters are typically provided in the form of discrete plural particles. The particles tend to agglomerate into solid masses or clumps when wetted by a liquid waste such as animal urine. A number of such clumping litters are known. One advantage of such clumping litters is that the solid clumps, which are formed upon wetting of the litter, can be separately removed as discrete entities from the remaining litter. The clumped litter can be discarded by the animal owner, leaving behind a quantity of relatively uncontaminated litter for future use. Animal owners, particularly owners of house cats, often find the clumping property of such litters to be convenient for periodic cleaning of the animal litter box. Ammonia-masking properties also are desirable in animal litters because ammonia, a breakdown product of the urea found in animal urine, is a significant factor that contributes to the undesirable odor of animal waste. Some known animal litters have good ammonia-masking properties.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

One feature of clay litters is the high density of the clay component of the litter. Because of this high density, a relatively heavy mass of litter must be used for a given volume of urine. In addition, the resulting clumps of soiled litter are somewhat heavy, and thus can fracture in the absence of strong particle adhesion. Another feature of clay litters is that, because the clay is not biodegradable, the litter cannot be flushed into some sewage systems after use. This may be inconvenient for certain animal owners.

In recognition of these features, animal litters made from biodegradable materials, such as wheat, corn, or other grain-based materials, have been provided. Such litters are often suitable for disposal by flushing into sewage systems. For instance, U.S. Pat. No. 6,014,947 purports to disclose a grain-based litter made from whole wheat or other ground grains. In recognition of the features inherent in clumping animal litters, biodegradable litters that exhibit a clumping property have undergone development. Like typical clumping clay litters, such litters often comprise discrete particles of a liquid-absorbent substrate having a liquid-activated adhesive coated thereon.

Numerous litters are disclosed in U.S. Pat. Nos. 8,734,768; 7,757,638; 7,753,002; 6,868,802; 6,622,658; 6,405,677; 6,216,634; 6,098,569; and 8,731,768, all assigned at issuance to Grain Processing Corporation of Muscatine, Iowa. These patents provide excellent teachings as to organic, biodegradable litters that, in preferred embodiments, are based exclusively on natural materials. The litters disclosed in these patents have excellent ammonia absorbing properties.

Conventional litters often include added oils in an effort to improve agglomeration of the litter particles and to reduce dust during mixing, handling, packaging, and use of the product. For example, U.S. Pat. No. 5,152,250 to Loeb describes mixing granular litter with grain flour to cause agglomeration and mineral oil to cause the flour to adhere to the grains. U.S. Pat. No. 6,053,125 purports to describe oil-coating both heavy density particles and light density particles, such as with mineral oil added at 4 percent by weight of the total weight of the particles.

U.S. Pat. No. 5,230,305 states that the rate of sorption of urine by a natural animal litter is dependent upon the particular natural product and process used to prepare the litter. Thus, if a grain based material was used to prepare the litter, the litter would contain the oils naturally associated with the grain and these oils might decrease the rate of sorption of urine by the litter. In an effort to increase the rate of urine sorption, a wettability enhancing agent is added to the litter and the particle size distribution of the litter is adjusted. The wettability increasing agent could be any material that increases the rate of sorption of an aqueous liquid, such as urine, and may be a surface active agent sprayed onto the surface of the litter particles.

Citrus materials, such as citrus pellets, have also been used to provide improved odor control. However, the inventor here has observed that some citrus materials, while providing an essence of citrus, may actually result in undesirable citrus odors when used.

The present application seeks to provide on animal litter that differs from the heretofore described litters.

SUMMARY

Sodium bisulfate surprisingly has been found to improve the strength and hardness of a compressed litter particle, such as a pellet, especially when the sorbent material in the litter comprises a rice fiber. An animal litter, process for preparing the animal litter and a method for removal of animal waste using the animal litter are provided herein. The animal litter may be in the form of discrete plural particles that tend to agglomerate when wetted and generally may comprise a sorbent; a lubricant; a cohesiveness agent; and sodium bisulfate or one of the other sulfates described herein in an amount effective to increase hardness relative to an otherwise-identical litter prepared in the absence of the sodium bisulfite. An alternative animal litter may be in the form of discrete plural particles that tend to agglomerate when wetted and generally may comprise a sorbent; a lubricant; a cohesiveness agent; and sodium bisulfate or one of the other sulfates described herein in an amount ranging from 0.5 to 5.0 wt. % by weight of the litter (this and all other material weight percentages described herein being on a dry solids basis unless otherwise stated).

The animal litters provided herein may be formulated entirely from naturally derived substrates, although it is contemplated that non-natural ingredients may also be incorporated. For example, the sorbent may comprise rice fiber. The litters may be provided in the form of discrete plural compacted particles, such as pellets, which tend to agglomerate when wetted. Preferably, the particles are pellets prepared by pelletizing the various components of the animal litter in a pellet mill.

A process for preparing the animal litter includes the steps of blending the ingredients and forming discrete plural compacted particles from the blend. For example, the process may include providing a blend of rice fiber, a second sorbent, and sodium bisulfate, and compacting the blend into discrete plural compacted particles which tend to agglomerate when wetted.

A method for removal of animal waste includes the steps of providing a container that includes an animal litter, allowing an animal to excrete waste into said litter, whereby liquid present in said container as a result of said waste causes at least a portion of said litter to agglomerate into at least one clump, and removing the clump from the container. The animal litter is as described herein and includes a sorbent, sodium bisulfate, a lubricant, and a cohesiveness agent.

BRIEF DESCRIPTION OF THE DRAWING

The FIGURE is a graph of particle size distribution for rice hulls as determined by laser diffraction.

DETAILED DESCRIPTION

The animal litters described herein may be formulated as clumping litters or as non-clumping litters but generally are provided in the form of a clumping litter. The litter preferably is formulated to take the form of pellets or other compacted forms, particularly when the litter is intended as a cat litter.

After the litter has become soiled, the liquid in the animal urine will cause some of the litter to form a clump. The soiled litter then may be removed from the box by removing the clump and any solid waste litter from remaining relatively unsoiled litter and disposing of the soiled litter. Alternatively, the soiled litter may be removed without separating it from any unsoiled litter in the box, by disposing of all or substantially all of the litter in the box. In either case, animal waste will be thereby removed. Optionally, the supply of litter may be replenished with fresh litter.

A range of desired properties for clumping animal litter has been identified. These properties include biodegradability, high sorption capacity, cohesion, clumpablility, ammonia and other odor masking, a density and texture trial acceptable for the target animal, clump strength, tendency to remain clumped, clump weight, and cost. In general, the various ingredients and processing conditions may be selected to accommodate a desired combination of properties. Some combinations of ingredients and processing conditions may not yield a litter that is commercially satisfactory. Selection of appropriate ingredients and processing conditions will become apparent upon review of the following description.

Citrus pulp has been used in some animal litters, but it has been found that citrus pulp may not always impart a pleasant odor. Commercially supplied citrus pulp is not consistent in pH from lot to lot, requiring measurement and adjustment of pH during manufacture of the litter. Therefore, while citrus may be employed in the litters described herein, the litters may be free or substantially free of components derived from citrus, such as less than 5% by weight citrus components, less than 4% by weight citrus component, less than 3% by weight citrus components, less than 2% by weight citrus components, less than 1% by weight citrus components, or less than 0.5% by weight citrus components. Surprisingly, it has been found that a litter formulated with rice hulls can result in a better-smelling product than one formulated with citrus, and that does not also have an adverse effect on suppression of animal waste odors. Rice hulls are neutral and therefore the more consistent processing may be used.

The animal litter is in the form of discrete plural particles, which particles generally are sufficiently cohesive for use as an animal litter. By "particles" it is contemplated granules or pellets obtained by compaction. The compaction may be any process suitable for compressing the ingredients from which the litter is composed to an extent that the internal cohesion of the ingredients is increased. Generally, the mass of ingredients should become sufficiently internally cohesive for use as an animal litter. The preferred method of compaction is by pelletizing the mixtures of ingredients in a pellet mill, but other processes (such as extrusion) may be employed. The pellets formed in a pellet mill (or the extrudate formed upon extruding the litter components, or other suitable compacted from) may if necessary be subjected to a process such as crumbling, to reduce the size of the product to a size suitable for use as a litter.

The animal litter generally includes at least one sorbent, a lubricant, a cohesiveness agent, and a sulfate such as sodium bisulfate (SBS). The animal litter can include a blend of the components that are then formed into discrete plural particles which tend to agglomerate when wetted. It is hypothesized that the sodium bisulfate forms a bond that is less soluble than other materials and therefore results in harder litter materials and clumped litter. In conjunction with SBS, other food-grade or pet grade acids may be employed, such as ascorbic acid, malic acid, tartaric acid, and the like may be used.

It is envisioned that other sulfates may be used in place of and/or in addition to SBS. For example, phosphoric materials, such as phosphoric acid compounds may be used. Exemplary such compounds include phosphoric acid, potassium acid tartrate, and sodium acid pyrophosphate. Additionally, one or more organosulfates may be used in addition to or as an alternative to SBS. Potential materials may include alkylbenzene sulfonate, ammonium laureth or lauryl sulfate, ammonium or sodium xylenesulfonate, sodium C14-16 olefin sulfonate, sodium cocoyl sarcosinate, sodium laureth sulfate, sodium myreth sulfate, sodium lauryl sulfate, sodium lauryl sulfoacetate, TEA-dodecylbenzenesulfonate, ethyl PEG-15 cocamine sulfate, dioctyl sodium sulfosuccinate, magnesium sulfate, and combinations thereof. It is theorized that sodium bisulfate and/or the other materials noted above may partially dissociate while also providing ionic bonding, as well as general bonding via adhesion between litter particles and within clumped litter.

Various grades of sodium bisulfate may be used in the litter, including food grade, pet grade, or the like, provided that the sodium bisulfate is present in an amount sufficient to enhance pellet hardness. Sodium bisulfate may be used in an amount effective to provide improved pellet strength. For example, it may be provided in an amount of about 0.05 to about 5.0 wt. % in the litter, preferably about 0.4 to about 1.5 wt. %. The sodium bisulfate and/or the other sulfates noted above, can be provided in amounts such as 0.05, 0.1, 0.2, 0.3, 0.4, 0.5, 0.6, 0.8, 1.0, 1.15, 1.35, 1.5, 2.0, 2.5, 3.0, 3.5, 4.0, 4.5, and 5.0 wt. %. The sodium bisulfate can be provided in the form of granules, which can be dissolved in water for use in the manufacture of the litter. The sodium bisulfate and/or other sulfates, may be provided in an amount effective to enhance adhesion between particles in the litter and/or adhesion in the clumped litter.

In addition to sodium bisulfate and the materials noted above, other acids may be included to neutralize ammonia odors or for adjustment of pH. For example, materials such as acetic acid, adipic acid, hydrochloric acid, lactic acid, malic acid, potassium acid tartrate, sodium acid pyrophosphate, succinic acid, sulfuric acid, tartaric acid, aconitic acid, alginic acid, benzoic acid, caprylic acid, propionic acid and combinations thereof may be used with sodium bisulfate and/or the other materials identified above.

The sorbent may be one or a combination of materials and may be present in the liter in an amount ranging from 15-80% by weight, preferably, 20-45% by weight, and if multiple sorbents are present, they may be present in any amounts relative to one another. The sorbent can include a variety of different materials and combinations thereof. For example, the sorbent can include rice fiber, such as rice hulls. The rice fiber can be present in an amount of about 3 to about 35 wt. %.

The particle size of the rice hulls may range from about 100 μm to about 5,000 μm. For example, the rice hulls may be part of a 30/80 grind having a bulk density of not less than 19 lbs./ft$^3$. The rice hulls may also have a fineness with not more than 0.1% remaining on a No. 10 US standard sieve, not more than 1% remaining on a No. 20 US standard sieve, not more than 95% remaining on a No. 80 US standard sieve, and not more than 97% remaining on a No. 100 US standard sieve. The particle size distribution for an exemplary rice hull composition is found in FIG. 1. The particle size distribution was determined by averaging three replicates using laser diffraction. It should be noted that the laser diffraction performs volume estimation to determine particle size assuming a spherical particle. However, since the rice hulls are not necessarily spherical, there may be some differences in particle size distribution when using other analytical methods.

The rice hulls may have a crude protein content of not less than 1.0 wt. %, a crude fat content of not less than 0.20 wt. %, and a crude fiber content of not more than 50 wt. %. The rice hulls may also have a water content of 10 wt. %, protein content of 2.4 wt. %, fat content of 0.50 wt. %, nitrogen free extract content of 27.9 wt. %, fiber content of 40.4 wt. %, ash content of 18.71 wt. %, and calcium content of 0.09 wt. %. The rice hulls may also have a moisture content of no more than about 10 wt. %.

Rice hulls may be the only sorbent in the litter. When used with another sorbent such as corn cob, the rice hulls may be present in an amount of 1%, 2%, 3%, 4%, 5%, 6%, 7%, 8%, 9%, 10%, 11%, 12%, 13%, 14%, 15%, 16%, 17% 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41% 42%, 43%, 44%, 45%, 46%, 47%, 48%, 49%, 50%, 51% 52%, 53%, 54%, 55%, 56%, 57%, 58%, 59%, 60%, 61%, 62%, 63%, 64%, 65%, 66%, 67%, 68%, 69% 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% by dry solids weight of the sorbent component of the litter.

The sorbent may further include ground corn cob. Corn cob is believed to function as a sorbent for animal urine, and to contribute favorably to the clumping properties of the litter. To enable clumping, the ground corn cob should be provided as a finely ground material. In this regard, the corn cob material may be finely ground such that it passes through a 1/16 inch screen, such as found in a hammer mill. Other forms and particle sizes of corn cob material may also be included in the animal litter. For example, corn cob material may be ground to have a larger and/or smaller particle size and may also be included in a combination of particle sizes. In many embodiments, no more than about 5% of the corn cob particles used to prepare the litter are larger than U.S. standard #30 mesh screen size while at least 50% of the corn cob particles are smaller than U.S. standard #40 mesh screen size and at least 20% of the particles are smaller than U.S. standard #80 mesh screen size. Although it is not intended to limit the invention to a particular theory of operation, it is believed that the particle size distribution heretofore described will yield particles with sufficiently small surface area to enhance absorption of liquid relative to particles of larger surface area while still allowing for ready processing in the manner discussed herein.

In some embodiments, the ground corn cob has the following screen profile:

| % over #8 | % over #14 | % over #20 | % over #30 | % over #40 | % over #80 | % Thru #80 | Total |
|---|---|---|---|---|---|---|---|
| 0.3 | 0.5 | 0.6 | 12.1 | 21.6 | 33.4 | 31 | 99.5 |

When used with another sorbent such as rice hulls, the corn cob material may be present in an amount of 1%, 2%, 3%, 4%, 5%, 6%, 7%, 8%, 9%, 10%, 11%, 12%, 13%, 14%, 15%, 16%, 17% 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41% 42%, 43%, 44%, 45%, 46%, 47%, 48%, 49%, 50%, 51% 52%, 53%, 54%, 55%, 56%, 57%, 58%, 59%, 60%, 61%, 62%, 63%, 64%, 65%, 66%, 67%, 68%, 69% 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% by dry solids weight of the sorbent component of the litter. When used together, the corn cob and rice hulls may be the only sorbent material in the litter, or one or both of the corn cob and rice hulls may be present in a majority amount by weight of the sorbent, or the corn cob and rice hulls may be present in other amounts.

The animal litter includes one or more lubricants including fats, oils and mixtures thereof. The lubricant is not necessarily believed to provide desired properties itself to the litter but is believed to be useful in connection with the preparation of the litter. The lubricant can be present in any amount sufficient to facilitate the compaction of the animal litter composition into particles, as described herein. For example, the animal litter may include ground virgin corn germ. Virgin germ contains oils and may be used as a lubricant. The germ may be included in any amount suitable to provide lubrication in the production process sufficient to enable manufacture. If the only lubricant is virgin germ, it can be used in an amounts ranging from about 0.1% to about 5.0% by weight, so as to provide a corn oil content of about 1-10% by weight of the litter. In the process of production of the litter, corn oil will be released from the litter and the remaining germ may to an extent function as a portion of the sorbent in the litter.

Other suitable lubricants include fats and other oils. Exemplary fats include lauric fats, such as babassu, coconut and palm kernel, and animal fats, such as butter oil, chicken fat, lard and beef tallow. Exemplary oils include fish oils, such as menhaden, and vegetable oils. Preferably, the lubricant is a vegetable oil because animals are often attracted to animal fats and fish oils as a food source. Exemplary vegetable oils include, for example, canola, cocoa butter, corn, cottonseed, olive, palm, peanut, rapeseed, soybean and sesame. When used, such lubricant may be used in any amount suitable to provide lubrication in the production process sufficient to enable manufacture, such as 1-10% by total weight.

The animal litter also includes at least one cohesiveness agent which is employed to enhance intraparticle cohesion of the litter particles, a property which is desired for transport and dispensing of the litter. The cohesiveness agent may be present in any amount suitable to enhance the cohesiveness of the granules of animal litter. For example, the cohesiveness agent may be present in an amount ranging from about 5% to about 40% by weight, preferably a range whose lower end may be 5%, 6%, 7%, 8%, 9%, or 10% and whose upper end may be 40%, 39%, 38% 37%, 36%, or 35%.

The cohesiveness agent may be a polysaccharide. A polysaccharide cohesiveness agent is believed to provide additional hydroxyl groups that enhance the bonding between grain proteins within the litter granule. It is further believed that the additional hydroxyl groups so function by enhancing the hydrogen bonding of proteins to starch and to other proteins.

Any suitable polysaccharide may be used, such as dextrins, maltodextrins, starches, flours, cellulosics, hemicellulosics, and the like. Preferably, the cohesiveness agent comprises a starch, and most preferably, the cohesiveness agent comprises a corn starch. It has been found that non-gelatinized, unmodified starches are especially suitable for use as cohesiveness agents in conjunction with the invention. When unmodified starches are employed, it is believed that such starches may contribute to a small extent to interparticle adhesion in the clumped litter.

The cohesiveness agent may further include a fibrous material. Fibers for use as a cohesiveness agent include soluble and insoluble fibers such as apple fiber, barley-bran flour, barley-flour, citrus fiber, citrus pulp sacs, cocoa, corn bran, corn fiber, oat bran, oat fiber, pea fiber, powdered cellulose, sodium carboxymethylcellulose, soy fiber, sugar beet fiber, wheat bran, and defatted wheat germ. To the extent that a cohesiveness agent is indeed in the litter formation, the cohesiveness agent is an ingredient that is different from the "sorbent." In other words, a litter that is said to include both a "sorbent" and a "cohesiveness agent" will have separate ingredients for the sorbent and the cohesiveness agent, even though the cohesiveness agent may to some extent absorb liquid and even thought the sorbent may contain plant fiber.

The litter may include further includes a supplemental cohesiveness agent, which is an ionic species that is believed to enhance protein-protein and/or protein-starch interactions. Any suitable ionic salt may be used in conjunction with the invention. For example, the supplemental cohesiveness agent may be selected from among the alkali and alkaline-earth salts of common anions, such as the halide, nitrate, nitrite, carbonate, phosphate, sulfate, and bicarbonate salts, and the like. Exemplary supplemental cohesiveness agents include of sodium chloride, calcium chloride, sodium carbonate, calcium carbonate, sodium bicarbonate and mixtures thereof. The supplemental cohesiveness agent may be present in any amount sufficient to assist the cohesiveness agent in enhancing the cohesion of the animal litter granules.

Without being bound by any particular theory, it is contemplated that the fiber provides for an enhancement of clump strength, or an increase in clump cohesiveness, and in many embodiments, an increase in both clump strength and cohesiveness. The enhancement in particle agglomeration, with respect both to clump strength and cohesiveness, is believed to be due to enhancement of adhesion between the particles, which in some cases is believed to be due to hydrogen bonding phenomena. Clump strength is a measure of the force required to fracture a clump of animal litter, while cohesiveness is a measure of the friability of a clump. A high clump strength is advantageous in that it reduces the likelihood of breakage of the clumps, thereby allowing the soiled animal litter to be removed more effectively. High clump strength also minimizes the likelihood of leaving behind soiled animal litter that may break off upon removal of soiled clumps. Both clump strength and cohesiveness, but especially cohesiveness, may be qualitatively evaluated with the increase in these properties being evaluated relative to an animal litter that does not include the fiber.

Because the animal litter is made from biodegradable materials, the litter is subject to spoilage, such as by molding or bacterial action. To prevent or inhibit such spoilage, the litter can include a microbial inhibitor. A microbial inhibitor can be present in any amount effective to inhibit or prevent the spoilage of the animal litter. Typically, any ingredient capable of maintaining a pH of the animal litter from about 3 to about 5.5 is effective to prevent or inhibit spoilage of the animal litter.

The spoilage inhibitor can be a mold inhibitor. Any suitable mold inhibitor can be employed in conjunction with the invention. The mold inhibitor can include, for example, sodium chloride (which can also provide supplemental cohesive properties), propionic acid, propionate salts (e.g., sodium propionate, calcium propionate and the like), citric acid, citric acid salts (e.g., sodium citrate, calcium citrate, potassium citrate and the like), benzoate salts (e.g., sodium benzoate), parabens (e.g., methylparaben, ethylparaben, propylparaben and the like), sorbic acid, and sorbic acid salts (e.g., potassium sorbate and the like), lactic acid and lactic acid salts, acetic acid and acetic acid salts, alginic acid and alginic acid salts, and any combination thereof.

Preferably, the mold inhibitor includes citric acid, sodium chloride, potassium sorbate, or any combination thereof. More preferably, the mold inhibitor includes a combination of citric acid, sodium chloride and potassium sorbate or a combination of citric acid and sodium chloride. Citric acid does not necessarily need to be used, especially when sodium bisulfate is used. However, when citric acid is used, it is preferably present in an amount of about 0.05% to 5% by weight of the animal litter. When sodium chloride is used, it is preferably present in the animal litter in an amount of about 3% by weight of the animal litter (sodium chloride is believed to function as a supplemental cohesiveness agent when used in this amount). When potassium sorbate is used, it is preferably present in the animal litter in an amount of from 0.1-0.5%, more preferably from 0.1-0.2%, by weight of the animal litter. Other microbial inhibitors may be included if desired, and such ingredients can be present in any amount suitable for their intended purpose.

The animal litter may also include other materials to help in odor absorption and/or elimination. For example, the animal litter may include an odor-absorbing effective amount such as an amount of 2 to 25%, of a carbon-based odor-absorbing material as described in U.S. Pat. No. 9,339,005 entitled "Odor-Absorbing Materials And Processes For Their Reparation And Use."

The litter optionally may be provided with a fragrance-imparting material to provide a pleasant scent. In some cases the litter includes no materials added specifically to impart fragrance. When used, the scent can be provided from a natural source, such as alfalfa, almond, amber, angelica root, anise, apple, apricot, banana, basil, bay, bay laurel, benzoin, bergamot, bitter orange, black pepper, bois de rose (rosewood), cajeput cardamom, carrot seed, cedarwood, cedarwood atlas, cinnamon, citronella, citrus, clary sage, clove, cocoa, coconut coffee, coriander, cranberry, cypress, elemi, eucalyptus globulous, eucalyptus, fennel, frankincense, galbanum, geranium, German chamomile, ginger, grapefruit, helichrysum, hyssop, jasmine, juniper berry, lavender, lemon, lemongrass, lily, linden blossom, mango, marjoram, melissa, mint, myrrh, myrtle, neroli, niaouli, nutmeg, orange, oregano, palm, parsley, patchouli, peach, peppermint petitgrain, pine, pineapple, raspberry, Roman chamomile, rose, rosemary, sandalwood, spearmint spruce, strawberry, tea, thyme, vanilla, vetiver, violet, yarrow, ylang, and the like. Plant parts that do not provide a scent or have very low scent but that are visually appealing can also be used. The plant parts can be subjected to a process to reduce the size of the parts to a size suitable for addition to an animal litter.

Essential oils or other plant extracts can be used in the litters described herein. Extracts can be physically obtained, such as by pressing or squeezing, or by using solvent, such as oil, organic solvent, or water, to process plant parts. For example, orange oil can be obtained from orange peels, and rose oil can be extracted from rose petals using vegetable or mineral oil. Commercially available essential oils can also be used, if desired. One or more plant extracts or essential oils can be blended to provide a desired scent. For example, a blend of plant extracts can be provided to give a rose, "earthy," "spring," "fresh," "ocean," or other desired scent.

Suitable fragrances include, for example, Modern lavender, Lavender Fields, Natural Fresh Clean, Baby Fresh Natural Amber Balsam, Natural Sweet Amber, Natural Fresh Citrus, Natural Fresh Air, and Rose from Fragrance West, Van Nuys, California, Baby Fresh, Lilac, Violet, Rose, Jasmine, and Lavender from Bell Flavors & Fragrances, Inc., Northbrook, Illinois, Natural lavender, Rose Geranium, Natural Rosemary Mint, Baby Powder, and Fresh Blossoms Natural from Flavor and Fragrance Specialties, Mahwah, New Jersey, and Lavender, Jasmine, Amber, and Fresh Wave from Alpha Aromatics, Fox Chapel, Pennsylvania.

In some embodiments, the litters provided herein include colorful plant parts, such as flowers, flower buds, petals, or the like, to provide visually appealing-colored particles to the litter. The colorful plants parts may also provide a natural scent to the litter and may be provided in combination with a natural based fragrance, such as with a scented oil. For example, brightly colored particles made from dried flowers and petals are often weak in scent and the fragrance of the particles can be enhanced by inclusion of a natural or synthetic fragrance.

The animal litter is packaged under conditions effective to lengthen its shelf life. The litters can be packaged in a plastic bag with oxygen barrier properties, such as a laminated polyethylene and polyester or nylon plastic package. The packaging may be purged with nitrogen gas to reduce the oxygen level inside the package to less than 10 percent v/v, preferably less than 2 percent v/v. The lower oxygen content reduces the oxidization of components such as those found in fragrances. Under these conditions, the shelf life of the litter can be at least about 20 weeks.

The animal litter preferably has a moisture content sufficiently high to prevent the articles of animal litter from becoming friable and sufficiently low to allow additional moisture to be absorbed. Preferably, the moisture content of the inventive animal litter is less than about 30% based on the total weight of the litter (the moisture content is expressed on a total weight basis as opposed to a dry solids basis). More preferably, the moisture content ranges from about 3% to about 25%; even more preferably, the moisture content ranges from about 5% to about 20%; and most preferably the moisture content is from about 5% to about 15%. It is contemplated that some of the moisture in the animal litter will be present originally in the sorbent materials and/or cohesiveness agent. In some embodiments, the moisture content will be about 12% or less.

In exemplary embodiments, the animal litter has been found effective in suppressing odors of animal waste such as animal urine. Animal urine contains urea, allantoin, or other compounds which break down to form ammonia. The ammonia odor of spent animal litter is often considered to be objectionable. Animal litters made in accordance with this application will be effective in substantially reducing ammonia odors, and a litter box (housed or exposed) containing such litter may remain substantially free from ammonia odors for about 30 hours or more after the animal has excreted waste into the litter.

The animal litter preferably has a density sufficient to allow interparticle binding, yet that will minimize the weight of the litter. The litter preferably has a bulk density ranging from about 400-800 $kg/m^3$. Lighter density may tend to make the litter too light and result in "tracking" by an animal, such as a cat. Density preferably is evaluated after loosely filling a container and measuring the weight of a specific volume of the litter.

It will be appreciated that the particle size distribution can have an effect on the functional properties of the animal filter. If there is a relatively high population of very large particles, the litter may absorb liquids more slowly and also may be less effective in masking ammonia odor or other undesirable odors of spent animal litter. On the other hand, a relatively high population of small particles or fines can result in "tracking" and reduced clump strength.

In many embodiments, the particle size of the finished litter is such that more than 90% of the particles are larger than a U.S. standard #20 mesh screen size while essentially all of the litter is smaller than a U.S. standard #5 mesh screen size. In some embodiments from 8-15% is larger than a U.S. standard #8 mesh screen size; 55-75% are larger than a U.S. standard #14 mesh screen size but smaller than a U.S. standard #8 mesh screen size, where essentially all of the rest is between a U.S. standard #14 mesh screen size and a U.S. standard #20 mesh screen size. In some embodiments finer particles are not present; in other embodiments, finer particles are present in an amount effective to about 20%; in some cases, up to about 15%; and in some cases, up to about 12%.

Because the animal litter is to be used to absorb animal waste, e.g., urine, the litter should have an absorption capacity sufficient to allow the animal litter to so function. The absorption capacity of the litter preferably is at least about 0.05 ml water per gram of litter, more preferably ranges from about 0.5 to about 1.5 ml/g, and most preferably ranges from about 0.5 to about 1 ml/g. The absorption capacities specified herein are determined per gram of animal litter, based on the absorption of deionized water.

Preferred absorption capacity ranges based on the absorption of deionized water are believed to approximate that of animal urine.

Other properties may be desired of an animal litter. For example, to minimize inconvenience and mess associated with packaging, transporting, and using the litter, the litter preferably generates a minimal amount of dust. The preferred litters do not generate substantial dust and ordinarily do not require dust reducing agents (although such may be added if desired). Moreover, the preferred litters have a sand-like texture that is not fluffy, which is preferred by domestic animals such as cats.

Another preferred property is clumping efficiency. Clumping efficiency is the amount of litter required to form a clump with a given volume of liquid, with lower amounts of required litter corresponding to higher clumping efficiencies. Preferably, to absorb 30 ml animal urine, less than about 60 g of litter is required; more preferably, less than about 40 g is required.

Other desired properties include biodegradability and tendency to remain clumped over time. Biodegradability is a particularly preferred property when it is desired to dispose of clumps of litter by flushing them into the toilet. The litter is believed to be at least as biodegradable as other grain-based litters, and thus the litter may be disposed of by flushing, even into a septic system. Moreover, the litter exhibits controlled water-absorbing capacity, making it easily flushable down a toilet without excessive expansion. This property can help avoid blockages of drain pipes, e.g., when cat owners flush the soiled litter down the toilet. Tendency to remain clumped refers to the stability of the clump of the soiled litter. A clumping filler should remain clumped for at least 24 hours after the clump has formed.

A process for preparing an animal litter is also provided. Generally, the process comprises compacting ingredients forming the animal litter into discrete plural particles of a size suitable for use as a litter. In some embodiments, the particle size is accomplished by reducing a larger mass to the desired size. Preferably, the process includes a step of compacting or compressing the particles of animal litter into granules or pellets, which most preferably is accomplished in a pelletizing operation. The stabilizer or mold inhibitor, cohesiveness agent, and/or lubricant, when used, can be added at any suitable stage, and preferably are mixed with the other components of the litter in the desired proportions prior to pelletizing of the grain-based substrate.

When a pellet mill is employed, the moisture content in the pellet mill feed preferably is in the ranges described herein with respect to the moisture content in the finished product, and preferably is 10-14%. Optionally, moisture can be added to the feedstock in the form of liquid water to bring the feedstock to the desired moisture content. The temperature in the pellet mill preferably is brought to about 70-90° C., e.g., 82° C., using steam. The pellet mill may be operated under any conditions that impart sufficient work to the feedstock to provide pellets. It is believed that the particle size of the starting materials, the temperature within the pellet mill, and other variables can affect the properties of the final product. The pellet mill can be operated with a suitable die (e.g., a 3/32 in. times 5/32 in. die) at a pressure and temperature effective to provide pellets. The pellets preferably are then crumbled in a pellet mill crumbier to provide discrete plural particles having a particle size capable of passing through an 8 mesh screen but being retained on a 20 mesh screen, or otherwise as described above. As described herein, lubrication is preferably provided by adding a virgin germ. In other embodiments, lubrication may be provided by adding another lubricant, such as a vegetable oil.

A method for removing animal waste is also provided, which method generally contemplates providing a container containing an animal litter described herein, allowing an animal to excrete waste into the container, whereby moisture from the waste causes the animal litter to agglomerate into at least one clump; and removing the clump of litter from the container and preferably any solid waste so as to remove the animal waste. By "container" is meant to include any enclosed or partially enclosed area, such as a litter box, a cage, a stall, a pen (such as a poultry coop), or the like. The method for the removal of animal waste is contemplated to be useful for all animals capable of excreting waste on land, such as cats, dogs, mice, birds, gerbils, reptiles, and other animals, and finds particular applicability in connection with removal of waste from domestic house cats. The method for the removal of animal waste also may be useful for the removal of waste generated by farm animals such as chickens, livestock, or the like.

The following examples further illustrate the invention, but should not be construed as limiting the scope of the invention.

Examples

Various animal litter compositions were prepared by mixing the following ingredients and pelletizing using a pellet mill with 5/32 inch diameter holes and 2 inch variable thickness die (15/8 inch and 2 inch thickness) at a temperature of around 180° F. (ranging between 165-185° F.). The product was dried to a moisture content below 12%. The final product was then crumbled to reduce the size of the particles.

Two control formulas were prepared and compared against examples that utilized rice hulls as at least a partial replacement for a component and/or the use of SBS. The first set of compositions were prepared based on a Clumping formula (CL) while the second set of compositions were prepared based on a Multiple Cat Clumping formula (MCC), which are outlined in more detail below.

Control compositions were prepared for each of the CL and MCC formulas, identified below as Comparative Example 1 and Comparative Example 2, while additional experimental examples were prepared based on the CL and MCC formulas. Example 1 was based on the Comparative Example 1 CL formula where 50% of the corn bran was replaced with rice hulls and 50% of the citric acid was replaced with SBS. Example 2 was based on the Comparative Example 2 MCC formula wherein 50% of the ground citrus pellets were replaced with rice hulls and a portion of the citric acid was replaced with SBS to have a ratio of 17:10. The details of these compositions are found below in Tables 1 and 2. The wt. % are all dry weight with the exception of the rice hulls, which include some moisture. In the examples noted below, the rice hulls include about 7 wt. % moisture.

TABLE 1

| | Clumping | | | |
|---|---|---|---|---|
| | Comparative Example 1 | | Example 1 with SBS and Rice Hulls | |
| | Per Ton | Wt. % | Per Ton | Wt. % |
| Corn | 868.00 | 43.4 | 918.00 | 45.9 |
| Virgin Germ Blend | 90.00 | 4.50 | 260.00 | 13.0 |
| DCM 121 Defatted Corn Germ Meal | 360.00 | 18.0 | 220.00 | 11.0 |
| Corn Bran Specially Processed Ultrafine | 220.00 | 11.0 | 100.00 | 5.00 |
| B20F Industrial Corn Starch Bulk | 210.00 | 10.5 | 140.00 | 7.00 |
| Corn Cobs Ground | 170.00 | 8.50 | 180.00 | 9.00 |
| Rice Hulls | — | — | 100.00 | 5.00 |
| Salt | 60.00 | 3.00 | 60.00 | 3.00 |
| Citric Acid 2000 lb. Tote Bag | 20.00 | 1.00 | 10.00 | 0.500 |
| SBS | — | — | 10.00 | 0.500 |
| Potassium Sorbate | 2.00 | 0.100 | 2.00 | 0.100 |
| | 2,000 | 100 | 2,000 | 100 |

TABLE 2

| | MCC | | | |
|---|---|---|---|---|
| | Comparative Example 2 | | Example 2 with SBS and Rice Hulls | |
| | Per Ton | Wt. % | Per Ton | Wt. % |
| Citrus Pellets | 528.00 | 26.4 | 212.00 | 10.6 |
| Virgin Germ Blend | 130.00 | 6.50 | 200.00 | 10.0 |
| DCM 121 Defatted Corn Germ Meal | 270.00 | 13.5 | 315.00 | 15.75 |
| Corn | 583.00 | 29.15 | 598.00 | 29.9 |
| Corn Cobs Ground | 100.00 | 5.00 | 160.00 | 8.00 |
| G-Guard 07400-00 Premium Feed | 90.00 | 4.50 | 75.00 | 3.75 |
| B20F Industrial Corn Starch Bulk | 210.00 | 10.5 | 140.00 | 7.00 |
| Salt | 60.00 | 3.00 | 60.00 | 3.00 |
| Rice Hulls | — | — | 211.00 | 10.55 |
| Citric Acid 2000 lb. Tote Bag | 27.00 | 1.35 | 17.00 | 0.850 |
| SBS | — | — | 10.00 | 0.500 |
| Potassium Sorbate | 2.00 | 0.100 | 2.00 | 0.100 |
| | 2,000 | 100 | 2,000 | 100 |

Example 1 replaced a portion of the corn bran form Comparative Example 1 with rice hulls while Example 2 replaced a portion of the citrus pellets from Comparative Example 2 with rice hulls. While these are only partial replacements, it is contemplated that 100% of the corn bran and 100% of the citrus pellets could be replaced with rice hulls.

Examples 1 and 2 generally showed improved performance relative to Comparative Example 1 and Comparative Example 2. More specifically, Examples 1 and 2 generally showed improved finished product color and odor, especially Example 2 vs. Comparative Example 2. Examples 1 and 2 also exhibit more consistent lower finished product pH. The product granules were also generally stronger with less particle breakdown and fewer finer particles (less dust) for Examples 1 and 2.

These examples were also tested for strength and other functionality. More specifically, the pellet hardness was testing using an Amandu Kahl Hercule M hardness tester. The test was conducted by ensuring the less resistant spring is in the handheld tester. The pressure screw was loosened all the way so that the tester was reading 0. The tension screw was loosened, and the cooled pellet then was placed perpendicular to the tester in the space between the anvil and the cone. The tension screw was tightened so the pellet is held firm, but there is no pressure on the pellet. Quickly and with consistent speed, the pressure screw was tightened until the pellet breaks. The number on the top scale is the kg of force used to break the pellet.

For clump strength testing, a Texture Analyzer TA.XTplus was used. For this test, approximately, 50 (+/−) 1 g of cat litter was weighed into a 50 mL polystyrene hexagonal weigh dish. Next, 50 mL of water was added via burette. Three samples were prepared for each test and the samples were left open to air for the time period required for testing (10 minutes, 1 hour, 8 hours, 16 hours, 24 hours). After the time has passed the 50 mL weigh dish was flipped upside down onto a large polystyrene weigh dish with pour spout (270 mL). The clump was popped out of the 50 mL weigh dish and align it under the TA-4 probe. The probe was then used to test the strength of the clump.

From this testing, Examples 1 and 2 also showed pellet strength (pellet hardness), quality, and improved clumps strength relative to Comparative Examples 1 and 2. These results are shown below in Table 3. Table 3 also includes other examples based on the Comparative Examples with varying amounts of rice hulls and/or sodium bisulfate.

TABLE 3

| | Pellet Hardness* | Temp (F.) | pH | Clump Strength (Texture Analyzer) 10 Min. | 1 Hr. | 7 Hr. | 16 Hr. | 24 Hr. |
|---|---|---|---|---|---|---|---|---|
| Example 3 (25% Rice Hulls in Clumping Formula) | 4 | 175 | 4.3 | 553.70 | 572.20 | 751.30 | 907.80 | 982.17 |
| Example 4 (50% Rice Hulls in Clumping Formula) | 4 | 175 | 4.3 | 526.17 | 600.73 | 792.00 | 1002.67 | 1131.50 |
| Comparative Example 3 (Clumping Formula) | 3 | 175 | 4.3 | 516.50 | 687.80 | 937.57 | 1172.17 | 1430.73 |
| Example 5 (25% Rice Hulls in MCC Formula) | 6-7 | 170 | 4.3 | 798.87 | 1147.43 | 1491.45 | 1633.43 | 1703.30 |
| Comparative Example 4 (MCC Formula) | 4-5 | 170 | 4.5 | 628.90 | 854.23 | 1219.03 | 1246.20 | 1399.70 |
| Example 6 (SBS and Citric Acid Blend (10:17) in MCC Formula) | 7 | 155 | 4.4 | 867.13 | 1197.03 | 1517.30 | 1692.20 | 1776.90 |
| Comparative Example 5 (MCC Formula) | 5 | 155 | 4.6 | 628.90 | 854.23 | 1219.03 | 1246.20 | 1399.70 |
| Example 7 (SBS and Citric Acid Blend (10:10) in Clumping Formula) | 5 | 165 | 4.2 | 581.33 | 726.00 | 975.90 | 1317.66 | 1463.50 |

TABLE 3-continued

| | Pellet Hardness* | Temp (F.) | pH | Clump Strength (Texture Analyzer) 10 Min. | 1 Hr. | 7 Hr. | 16 Hr. | 24 Hr. |
|---|---|---|---|---|---|---|---|---|
| Comparative Example 6 (Control Clumping Formula) | 3 | 165 | 4.4 | 516.50 | 687.80 | 937.57 | 1172.17 | 1430.73 |
| Example 1 (SBS and Citric Acid Blend (10:10) w/50% Rice Hulls in Clumping Formula) | 6-7 | 175 | 4.3 | 561.90 | 782.87 | 1101.17 | 1335.60 | 1586.30 |
| Comparative Example 1 (Clumping Formula) | 5 | 175 | 4.3 | 549.00 | 746.93 | 1019.23 | 1240.23 | 1393.40 |
| Example 2 (SBS and Citric Acid Blend (10:17) w/50% Rice Hulls in MCC Formula) | 6 | 170 | 4.3 | 899.17 | 1126.93 | 1262.60 | 1629.07 | 1676.73 |
| Comparative Example 2 (MCC Formula) | 5 | 170 | 4.4 | 838.10 | 1027.03 | 1133.57 | 1276.87 | 1466.37 |

*(on a scale of 0-50 kg)

Examples 1 and 2 were also tested for water holding capacity versus Comparative Examples 1 and 2. Example 1 had a water holding capacity of 1.52 ml/g while Comparative Example 1 had a water holding capacity of 1.44 ml/g. Example 2 had a water holding capacity of 1.53 ml/g while Comparative Example 2 had a water holding capacity of 1.88 ml/g.

The particle size, clump weights, moisture content, pH, and bulk densities were analyzed for Examples 1 and 2 as well as Comparative Examples 1 and 2. The particle size distribution was analyzed using various sieves, as outlined in Tables 4 and 5 below.

TABLE 4

| | % over No. 8 | % over No. 14 | % over No. 20 | % over No. 30 | % over No. 40 | % over No. 80 | % in pan | Clump Weight | Moisture % | pH | Loose Bulk Density (lb/ft$^3$) | Packed Bulk Density (lb/ft$^3$) |
|---|---|---|---|---|---|---|---|---|---|---|---|---|
| Comparative Example 1 | 19.9 | 51.2 | 19.7 | 3.7 | 1.8 | 2.6 | 1.5 | 60.1 | 9.7 | 4.3 | 34.3 | 38.1 |
| Specs: | 25% max | | | | | | | 50-65 | 9-12 | 3.5-4.5 | 30-40 | 35-45 |
| Example 1 | 21.0 | 49.2 | 21.2 | 3.4 | 1.8 | 1.9 | 1.7 | 60.8 | 9.4 | 0<br>4.3 | 0<br>33.9 | 0.0<br>39.0 |
| Specs: | 25% max | 0 | 0 | 0 | 0 | 0 | 0 | 50-65 | 9-12 | 3.5-4.5 | 30-40 | 35-45 |

TABLE 5

| | % over No. 8 | % over No. 14 | % over No. 20 | % over No. 30 | % over No. 40 | %o ver No. 80 | % in pan | Clump Weight | Moisture % | pH | Loose Bulk Density (lb/ft$^3$) | Packed Bulk Density (lb/ft$^3$) |
|---|---|---|---|---|---|---|---|---|---|---|---|---|
| Comparative Example 2 | 20.0 | 65.6 | 10.2 | 1.4 | 0.6 | 1.1 | 1.2 | 58.9 | 10.1 | 4.4 | 34.5 | 38.3 |
| Specs: | 25% max | | | | | | | 50-65 | 9-12 | 3.5-4.5 | 30-40 | 35-45 |
| Example 2 | 22.4 | 63.8 | 9.9 | 1.3 | 0.4 | 0.7 | 1.0 | 63.7 | 10.3 | 4.3 | 34.7 | 38.5 |
| Specs: | 25% max | | | | | | | 50-65 | 9-12 | 3.5-4.5 | 30-40 | 35-45 |

Additional testing was conducted to compare the performance of compositions of Example 1 and Comparative Example 1 for use as cat litter by 60 testers. Samples of each of the compositions were tested for two-week periods and then compared. Testers were asked to rate overall satisfaction, smell and color of unused litter, dust, clumping, scoopability, odor control, cat happiness, and likelihood to recommend.

Testing indicated generally that Example 1 was significantly better than Comparative Example 1 for overall satisfaction, likelihood to recommend, and ease of scooping. The testing also indicated that Example 1 clumps well, absorbs well, and pours with little to no dust.

Similar testing was conducted to compare the performance of compositions of Example 2 and Comparative Example 2 for use as cat litter by 60 testers. Samples of each of the compositions were tested for two-week periods and then compared. Testers were asked to rate overall satisfaction, smell and color of unused litter, dust, clumping, scoopability, odor control, cat happiness, and likelihood to recommend.

Testing indicated generally both products performed well with users while Comparative Example 2 showed worse performance breaking down during week 2 with notable changes between weeks. Other users noted that Example 2 had harder clumps whereas Comparative Example 2 broke apart, did not clump as fast or as hard, and had a slight odor.

The testing showed that Example 1 was significantly better than Comparative Example 1 for overall satisfaction, likelihood to recommend, and ease of scooping. The testing also indicated that Example 1 clumps well, absorbs well, and pours with little to no dust.

Based on the testing, it is hypothesized that the use of sodium bisulfate may provide for a number of advantages and improvements to animal litter in addition to providing stronger pellets and granules during litter production, which helps to reduce granule breakdown during litter box usage. For example, the sodium bisulfate can help to reduce finished product pH. The sodium bisulfate may also help provide tighter and stronger clumps which can be easy to scoop and decrease clump breakage. The sodium bisulfate may also help function as a preservative to decrease the growth of bacteria and fungi. It may also help prevent browning and limit spoilage, amongst other features. It is hypothesized that sodium bisulfate may provide for benefits over other materials, such as citric acid. Citric acid has a pH of 1.89 and a water activity of 0.3882. Sodium bisulfate, on the other hand, has a pH of 0.87 and a water activity of 0.5129. Because of these differences, sodium bisulfate can help decrease spoilage with lower pH and lower water activity.

All references cited herein are hereby incorporated by reference in their entireties.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such.

All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. Animal litter comprising:

a sorbent;

a lubricant;

a cohesiveness agent; and sodium bisulfate, the animal litter being in the form of discrete plural particles which tend to agglomerate when wetted, the sodium bisulfate being present in an amount effective to enhance the strength of the particles;

wherein the sorbent comprises rice fiber; and wherein the sodium bisulfate is present in an amount of about 0.05 to about 5.0 wt. %.

2. The animal litter of claim 1 wherein the rice fiber is present in an amount of about 3 to about 35 wt. %.

3. The animal litter of claim 1 wherein the rice fiber comprises rice hulls.

4. The animal litter of claim 1 wherein the sorbent further comprises ground corn cobs.

5. The animal litter of claim 1 wherein the lubricant is selected from the group consisting of corn germ, virgin corn germ, fats, oils and mixtures thereof.

6. The animal litter of claim 1 wherein the cohesiveness agent comprises corn starch.

7. The animal litter of claim 1 further comprising a mold inhibitor selected from the group consisting of citric acid, potassium sorbate, and mixtures thereof.

* * * * *